(12) United States Patent
Kwon

(10) Patent No.: US 9,664,250 B2
(45) Date of Patent: May 30, 2017

(54) VARIABLE FREQUENCY DAMPER FOR DRIVE SHAFT OF VEHICLE

(71) Applicant: Hyundai Motor Company, Seoul (KR)

(72) Inventor: Byoungho Kwon, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/931,129

(22) Filed: Nov. 3, 2015

(65) Prior Publication Data

US 2016/0290435 A1 Oct. 6, 2016

(30) Foreign Application Priority Data

Mar. 31, 2015 (KR) .................. 10-2015-0044869

(51) Int. Cl.
*F16F 15/14* (2006.01)

(52) U.S. Cl.
CPC ...... *F16F 15/1442* (2013.01); *F16F 2228/04* (2013.01); *F16F 2228/066* (2013.01); *F16F 2230/0047* (2013.01); *Y10T 464/20* (2015.01); *Y10T 464/50* (2015.01)

(58) Field of Classification Search
CPC . F16C 1/108; F16F 7/108; F16F 15/12; F16F 15/1201; F16F 15/1202; F16F 15/1207; F16F 15/1442; F16F 2222/08; F16F 2228/04; F16F 2228/066; F16F 2230/0047; Y10T 464/20; Y10T 464/50
USPC .................................................. 464/23, 180
See application file for complete search history.

(56) References Cited

U.S. PATENT DOCUMENTS

| | | | | |
|---|---|---|---|---|
| 5,303,681 | A * | 4/1994 | Crofts | F02B 75/06 123/192.1 |
| 6,606,922 | B2 * | 8/2003 | Case | F16F 15/36 464/180 |
| 7,946,925 | B2 * | 5/2011 | Kawakatsu | F16F 15/1442 188/380 |
| 8,376,868 | B2 * | 2/2013 | Hagino | F16F 15/1492 464/180 |
| 8,439,150 | B1 | 5/2013 | Mesa | |
| 2006/0279029 | A1 * | 12/2006 | Souyri | F16F 13/28 267/140.12 |
| 2008/0176663 | A1 * | 7/2008 | Hatanaka | F16F 15/1442 464/180 |

FOREIGN PATENT DOCUMENTS

| | | |
|---|---|---|
| JP | 2008-2552 A | 1/2008 |
| JP | 2009-51477 A | 3/2009 |
| JP | 2009-79731 A | 4/2009 |
| JP | 2009-191995 A | 8/2009 |
| JP | 4893362 B2 | 3/2012 |
| JP | 2012-197910 A | 10/2012 |

(Continued)

*Primary Examiner* — Josh Skroupa
(74) *Attorney, Agent, or Firm* — Morgan Lewis & Bockius LLP

(57) ABSTRACT

A variable frequency damper for a drive shaft of a vehicle may include a mass body made of a metallic material and having mass, a damper body disposed on the drive shaft and to which the mass body is coupled, a banding member which fixes the damper body to the drive shaft, and a rigidity tuning member which is disposed on the banding member to press the damper body, and changes rigidity of the damper body depending on a degree to which the damper body is pressed.

6 Claims, 4 Drawing Sheets

(56) References Cited

FOREIGN PATENT DOCUMENTS

| | | |
|---|---|---|
| JP | 2012-233523 A | 11/2012 |
| KR | 10-2005-0066156 A | 6/2005 |
| KR | 10-2007-0108670 A | 11/2007 |
| KR | 10-0822572 B1 | 4/2008 |
| KR | 10-0887597 B1 | 3/2009 |
| KR | 10-2010-0033610 A | 3/2010 |
| KR | 10-2012-0114124 A | 10/2012 |
| KR | 10-2013-0039598 A | 4/2013 |
| KR | 10-1319979 B1 | 10/2013 |
| KR | 10-1344191 B1 | 12/2013 |

* cited by examiner

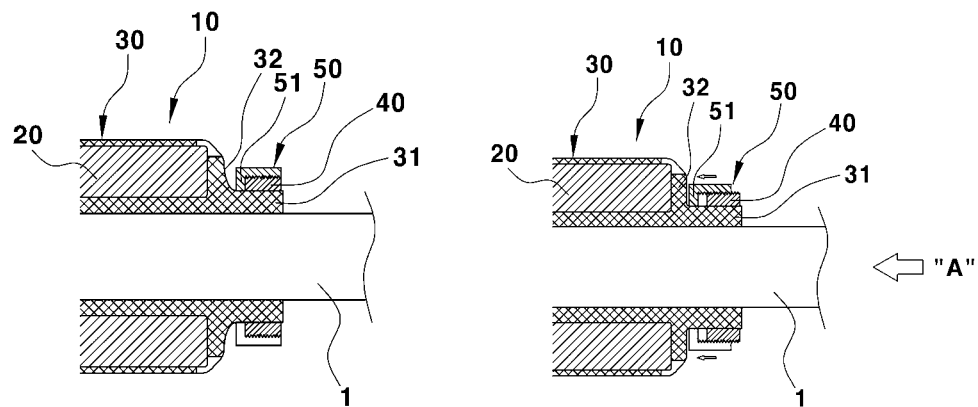
FIG. 5A   FIG. 5B
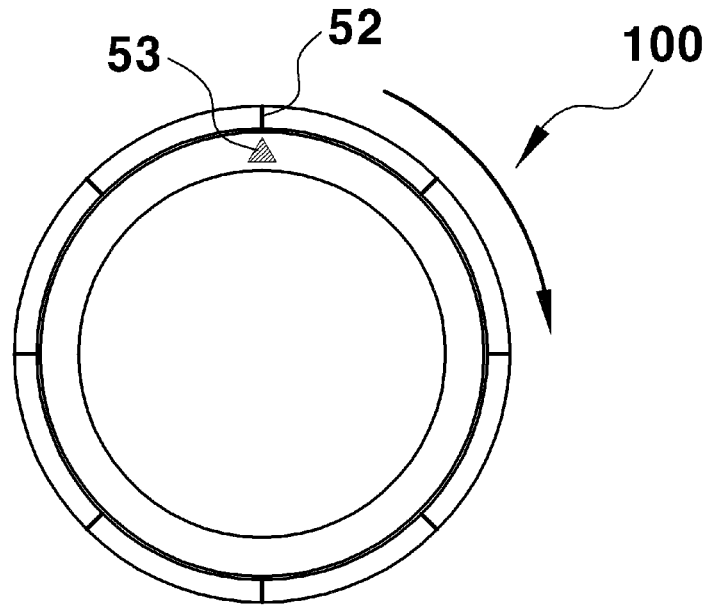
VIEW "A"
FIG. 6

VARIABLE FREQUENCY DAMPER FOR DRIVE SHAFT OF VEHICLE

CROSS-REFERENCE TO RELATED APPLICATION

The present application claims priority to Korean Patent Application No. 10-2015-0044869 filed Mar. 31, 2015, the entire contents of which is incorporated herein for all purposes by this reference.

BACKGROUND OF THE INVENTION

Field of the Invention

The present invention relates to a damper for a drive shaft of a vehicle. More particularly, the present invention relates to an integrated variable frequency damper which may easily tune a damping frequency, and thus may be applied to all types of drive shafts regardless of the type of vehicle, specifications of power trains (PT), and regions.

Description of Related Art

A drive shaft of a vehicle serves to transmit power, which is generated by an engine and transmitted through a transmission, to wheels.

Torsion and bending vibration occur in the drive shaft due to rotational force of the engine, and vibration occurs when a rotational speed of the drive shaft reaches a certain rotational speed while the drive shaft rotates at a high speed.

Vibration, which occurs in the drive shaft, degrades driving stability of the drive shaft, has an adverse effect on a drive system, and generates booming noise that causes deterioration in silence property.

In particular, in a case in which a frequency of the vibration generated in the drive shaft is matched with a natural frequency of the drive shaft, booming noise is increased as the frequency is further increased, and the increased vibration causes resonance, which may destroy the drive shaft or may cause fatal damage to the drive shaft.

A horizontal length of the drive shaft is changed depending on a size of the vehicle and positions at which the engine and the transmission are mounted, and as a diameter and a shape of the drive shaft are changed, a resonant frequency is also changed.

In general, the resonant frequency of the drive shaft is matched with a portion vulnerable to acceleration noise and vibration of the vehicle, which is the main cause of deterioration in NVH (noise, vibration, and harshness) performance of the vehicle.

Therefore, as illustrated in FIG. 1, a dynamic damper 110, which is adapted to a resonant frequency of the drive shaft, is installed on a drive shaft 1 in order to reduce vibration and noise.

The damper 110 generates vibration with a certain frequency, which may cancel vibration generated in the drive shaft 1, and cancels the vibration, thereby ensuring stability of the drive shaft and the drive system, and minimizing the occurrence of noise.

FIG. 2 is a configuration view illustrating a cross-sectional shape of the dynamic damper according to the related art, and the dynamic damper 110 includes a mass body 120 which is made of a metallic material and defines mass, a hollow damper body 130 which is made of an elastic rubber material and formed to surround the mass body 120, and banding members 140 which fix the damper body 130 to the drive shaft 1.

The dynamic damper 110 is mounted on an outer circumferential surface of the drive shaft 1. The damper body 130 to which the mass body 120 is coupled is fitted with the outer circumferential surface of the drive shaft 1, the banding members 140 are fastened to both end portions of the damper body 130, and then the banding members 140 are tightened, so that the dynamic damper 110 is fixed to the drive shaft 1.

Therefore, both the end portions of the damper body 130 are coupling portions 131 that are fixed to and supported on the drive shaft 1 by the banding members 140, and bridge portions 132, which are connected between a portion where the mass body 120 is installed and the coupling portions 131, are rigid portions that exhibit rigidity.

A natural frequency of the dynamic damper 110 is changed depending on rigidity k that depends on mass of the mass body 120 and physical properties of the rubber material that constitutes the damper body 130 including the rigid portion 132.

FIG. 3 is a view illustrating a one-degree-of-freedom model of the drive shaft and the dynamic damper. The damper is being developed to be adapted to the resonant frequency of the drive shaft, and a control frequency of the dynamic damper may be tuned in accordance with changes in mass and rigidity of the drive shaft.

However, significant development costs, such as costs required to manufacture molds, are required to manufacture the dynamic damper that is adapted to the resonant frequency of the drive shaft, and as a result, there is a need for an integrated damper system that may be easily tuned and applied to various types of vehicles and drive shafts.

Typically, a damping frequency is implemented by tuning values of mass and and rigidity kd of the damper (mass body), and the damping frequency of the damper is changed depending on the type of vehicle and a difference in power trains (PT) such as the engine, the transmission, and the like.

The main frequency of the damper is also changed depending on a regional and seasonal variation in temperature, and as a result, there is inconvenience because various types of dampers need to be developed and manufactured to satisfy the above conditions, and significant costs are required to develop and manufacture various types of dampers.

The prior art discloses a variable dynamic damper for a propeller shaft, in which a fluidic material with high specific gravity, which allows weight transition of a weight by means of centrifugal force that is changed depending on a rotational speed, is injected into the propeller shaft, thereby effectively reducing noise and vibration within a certain frequency region that is changed depending on a rotational speed of the propeller shaft while the vehicle travels.

As described above, a technology, which controls frequency properties that are changed depending on a rotational speed, is known as a technology in the related art, but a damper system, which may easily tune a frequency to a desired frequency, is not proposed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an integrated variable frequency damper which may easily tune a damping frequency, and thus may be applied to all types of drive shafts regardless of the type of vehicle, specifications of power trains (PT), and regions.

According to various aspects of the present invention, a variable frequency damper for a drive shaft of a vehicle may include a mass body made of a metallic material and having mass, a damper body installed on the drive shaft and to which the mass body is coupled, a banding member which fixes the damper body to the drive shaft, and a rigidity tuning member which is disposed on the banding member to press the damper body, and changes rigidity of the damper body depending on a degree to which the damper body is pressed.

The rigidity tuning member may be disposed on the banding member, which fixes an end portion of the damper body to the drive shaft, so as to be movable in an axial direction based on the damper and the drive shaft, so that a degree to which the damper body is pressed is changed depending on a position of the rigidity tuning member in the axial direction.

The rigidity tuning member may press a bridge portion that is a portion that is connected between a portion of the damper body where the mass body is disposed and the end portion of the damper body which is fixed to the drive shaft by the banding member.

The rigidity tuning member may be formed in a ring shape and coupled to an outer circumferential surface of the banding member in a threaded connection manner.

A pressing portion, which has a shape having a decreased inner diameter, may be formed at one end of the rigidity tuning member to protrude toward an inside of the ring shape, and the pressing portion may press the damper body.

The variable frequency damper may further include a display device which visually and distinguishably displays a rotation amount of the rigidity tuning member.

The display device may include gradations which are provided on the rigidity tuning member in a circumferential direction, and an indicating portion which is provided on the banding member to indicate one of the gradations.

Therefore, the integrated variable frequency damper for a drive shaft according to the present invention is configured to be able to change rigidity of the rigid portion of the damper while equally maintaining the mass of the damper, and as a result, there are advantages in that it is possible to easily tune a damping frequency, and it is possible to apply the integrated variable frequency damper to all types of drive shafts regardless of the type of vehicle, specifications of the power train, and regions.

In comparison with a case in which the damper is separately applied in accordance with the type of vehicle and the specifications of the power train, when the integrated variable frequency damper of the present invention is applied, a problem in respect to vibration in the vehicle body caused by resonance of the drive shaft may be solved, thereby remarkably reducing costs required to develop and manufacture the damper.

A problem in respect to resonance of the drive shaft, which causes vibration in the vehicle body, may be solved only by using one damper system of the present invention, and the damper of the present invention is durable against dispersion of components which may occur when the damper is manufactured, and may be easily tuned after the damper is mounted in the vehicle, thereby improving efficiency in managing quality regarding NVH performance.

A problem in respect to quality of the damper, which may occur due to seasonal variations and a regional difference, may be easily solved, thereby improving marketability of the vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B are configuration views illustrating a cross-sectional shape of the exemplary damper according to the present invention.

FIG. 6 is a view illustrating a display device that displays a degree of tuning of the exemplary damper according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various embodiments of the present invention are directed to providing an integrated variable frequency damper which may easily tune a damping frequency, and thus may be applied to all types of drive shafts regardless of the type of vehicle, specifications of power trains, and regions.

The integrated variable frequency damper of the present invention is mainly characterized by being configured to change a damping frequency by changing rigidity of a rigid portion of the damper while equally maintaining mass of the damper.

Figure 1:
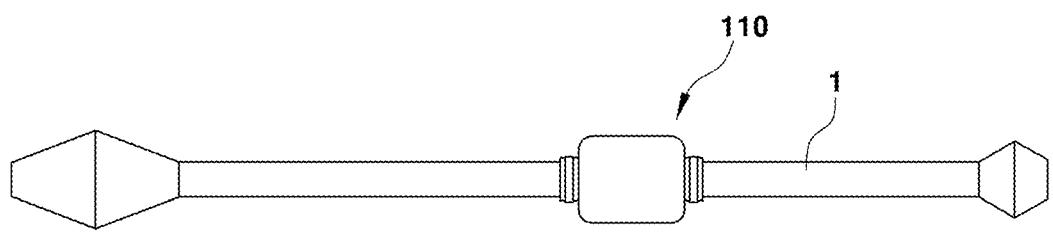
FIG. 1 is a view illustrating a state in which a damper is installed on a drive shaft according to the related art.
Figure 2:
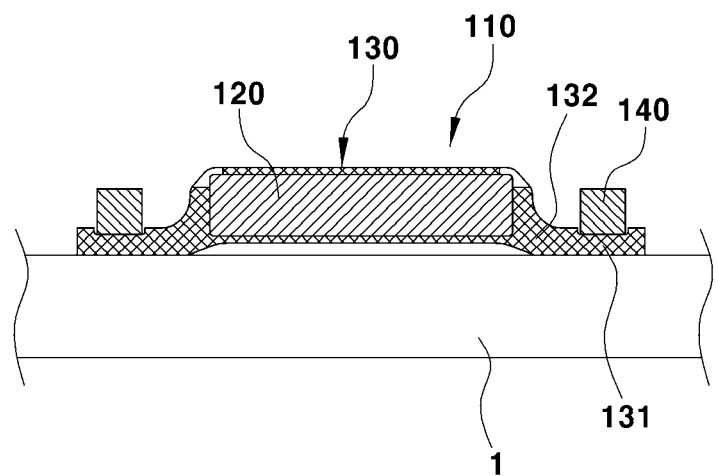
FIG. 2 is a configuration view illustrating a cross-sectional shape of a dynamic damper according to the related art.
Figure 3:
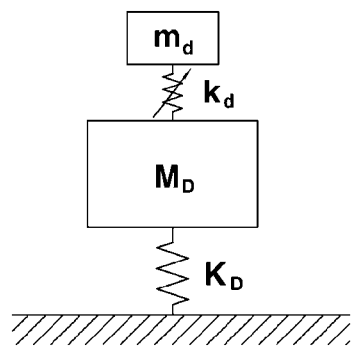
FIG. 3 is a view illustrating a one-degree-of-freedom model of a drive shaft and a dynamic damper according to the related art.
Figure 4:
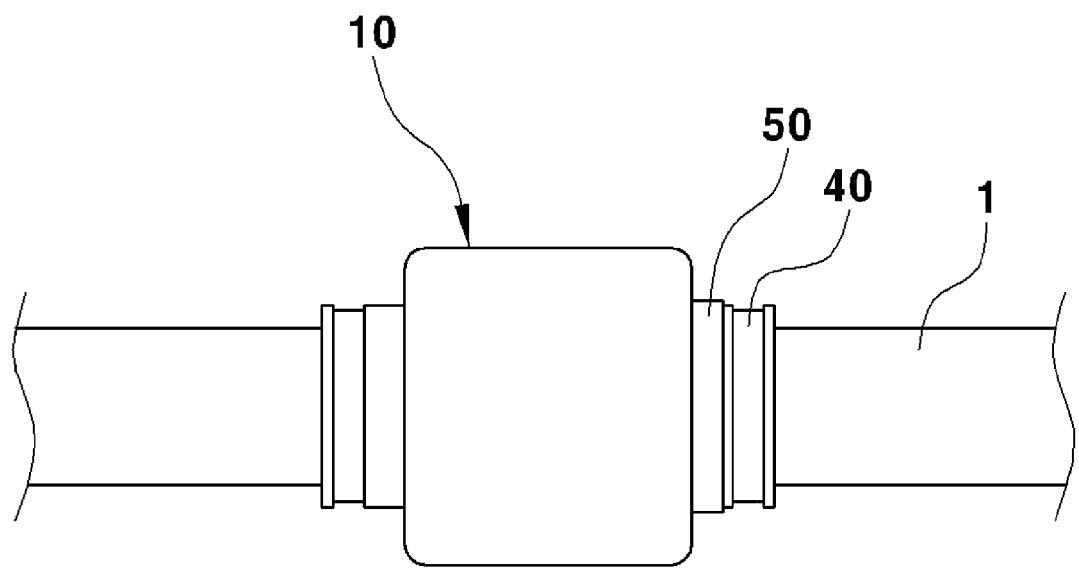
FIG. 4 is a view illustrating a state in which an exemplary damper according to the present invention is disposed on a drive shaft.

FIG. 4 is a view illustrating a state in which a damper according to various embodiments of the present invention is installed on a drive shaft, and FIG. 5A and FIG. 5B are configuration views illustrating a cross-sectional shape of the damper according to various embodiments of the present invention.

As illustrated, a damper 10 according to various embodiments includes a mass body 20 which is made of a metallic material and has mass, a hollow damper body 30 which is made of an elastic rubber material and formed to surround the mass body 20, a banding member 40 which fixes the damper body 30 to a drive shaft 1, and a rigidity tuning member 50 which is installed on the banding member 40 so as to be able to press the damper body 30 and changes rigidity of the damper body 30 depending on a degree to which the damper body 30 is pressed.

The damper 10 is mounted on an outer circumferential surface of the drive shaft 1. The damper body 30 to which the mass body 20 is coupled is fitted with the outer circumferential surface of the drive shaft 1, the banding members 40 are fastened to both end portions of the damper body 30, and then the banding members 40 are tightened, whereby the damper 10 is fixed to the drive shaft 1.

The mass body 20, which is coupled to the damper body 30, is a portion that serves as the mass of the damper 10. Both the end portions of the damper body 30 are coupling portions 31 that are fixed to the drive shaft 1 by the banding members 40. Bridge portions, which are connected between a portion where the mass body 20 is installed and the coupling portions 31, are rigid portions 32 that exhibit rigidity.

The banding member 40 performs a simple function of fixing the damper 10 to the drive shaft 1 and supporting the damper 10, and the rigidity tuning member 50, which may change rigidity of the damper 10, is coupled to the banding member 40.

The rigidity tuning member 50 is coupled to and installed on the banding member 40 so as to be movable in an axial direction thereof based on the damper 10 and the drive shaft 1 so that the rigidity tuning member 50 on the banding member 40 may press the damper body 30 and change a degree to which the damper body 30 is pressed. The rigidity tuning member 50 is installed to be able to press the bridge portion 32 of the damper body 30, that is, the rigid portion 32 that exhibits rigidity at the damper 10.

A degree to which the rigid portion 32 is pressed, that is, a degree to which the rigidity tuning member 50 presses the rigid portion 32 is changed depending on a degree to which the rigidity tuning member 50 is moved in the axial direction from the banding member 40 to the rigid portion 32 of the damper body 30.

In particular, in a case in which a degree to which the rigidity tuning member 50 presses the rigid portion 32 is changed, rigidity of the damper may be changed. In a case in which a degree to which the rigidity tuning member 50 is moved in the axial direction and a degree to which the rigidity tuning member 50 presses the rigid portion 32 are changed, rigidity of the rigid portion 32 is increased or decreased based on an inherent rigidity value of the rigid portion 32 of the damper 10.

As rigidity of the rigid portion 32 is increased or decreased, a control frequency of the damper 10, that is, a damping frequency is increased or decreased, and the damping frequency may be tuned to a desired damping frequency by adjusting a position of the rigidity tuning member 50 in the axial direction, and by adjusting rigidity of the rigid portion 32 through the adjustment of the position of the rigidity tuning member 50 in the axial direction.

As the rigidity tuning member 50 is rotated to more strongly press the rigid portion 32, rigidity of the rigid portion 32 and rigidity of the damper 10 may be further increased, and as the rigidity is increased, the damping frequency is increased.

As a degree to which the rigid portion 32 is pressed is decreased, rigidity of the rigid portion 32 and rigidity of the damper 10 are decreased, and as the rigidity is decreased, the damping frequency is decreased.

In various embodiments, the rigidity tuning member 50 may be coupled to and installed on the outer circumferential surface of the banding member 40 in a threaded connection manner, and in this case, the rigidity tuning member 50 may be moved in the axial direction and the position of the rigidity tuning member 50 may be adjusted by rotating the rigidity tuning member 50.

In particular, the position of the rigidity tuning member 50 in the axial direction and rigidity of the rigid portion 32 may be adjusted depending on a rotation amount of the rigidity tuning member 50. A direction in which the rigidity tuning member 50 is moved is determined depending on a direction in which the rigidity tuning member 50 is rotated, and the position of the rigidity tuning member 50 in the axial direction and rigidity of the rigid portion 32 are determined depending on the rotation amount of the rigidity tuning member 50.

When describing a shape of the rigidity tuning member 50, the rigidity tuning member 50 is manufactured in a ring shape so as to be able to be coupled to the outer circumferential surface of the banding member 40 in a threaded connection manner, and has a structure in which a pressing portion 51, which has a shape having a decreased inner diameter, is formed at one end thereof to protrude toward the inside of the ring shape.

The pressing portion 51 is a portion that presses the rigid portion 32 of the damper 10 when the rigidity tuning member 50 is moved in the axial direction (to the left in the drawing).

In various embodiments, in order to easily carry out tasks of adjusting frequency and tuning the damper in accordance with the type of vehicle, specifications of the power train, specifications of the drive shaft 1, or the like, a display device 100, which visually and distinguishably displays the rotation amount of the rigidity tuning member 50, may be provided.

FIG. 6 is a view illustrating the display device 100 that displays a degree to which the damper 10 according to various embodiments of the present invention is tuned. As illustrated, the rigidity tuning member 50 and the banding member 40 are provided with gradations 52 and an indicating portion 53 which quantify a degree to which the rigidity tuning member 50 is tuned (or a degree to which the rigid portion is pressed and a degree to which rigidity is changed)

as the rotation amount, and indicate a rotational position of the rigidity tuning member 50 so that an operator may easily recognize a damping frequency according to the rotation amount.

In this case, the gradations 52 are provided on the rigidity tuning member 50 in a circumferential direction, and the indicating portion 53, which indicates one of the gradations, is provided on the banding member 40 of which the positions is fixed, such that the operator may easily recognize the rotational position and the rotation amount of the rigidity tuning member 50 by using the gradations 52 and the indicating portion 53, and a degree to which the damper is turned according to the rotational position and the rotation amount of the rigidity tuning member 50.

Even though FIG. 4 illustrates that the rigidity tuning member 50 is installed only on the right banding member 40 of the two banding members 40 disposed at both the end portions of the damper 10, the rigidity tuning members 50 may be installed on both of the two banding members 40.

Hereinafter, tuning effects obtained by virtue of the installation of the rigidity tuning member 50 will be described below.

Figure 7:
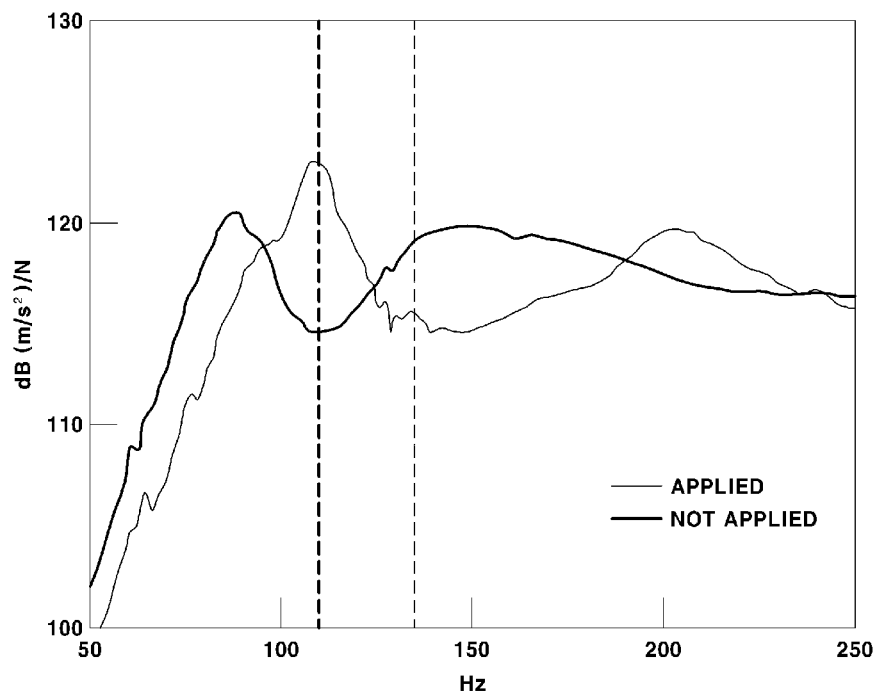
FIG. 7 is a view for comparing results of a frequency analysis of the drive shaft in a case in which the exemplary damper of the present invention is applied to the drive shaft and a case in which the damper in the related art is applied to the drive shaft.
Figure 8:
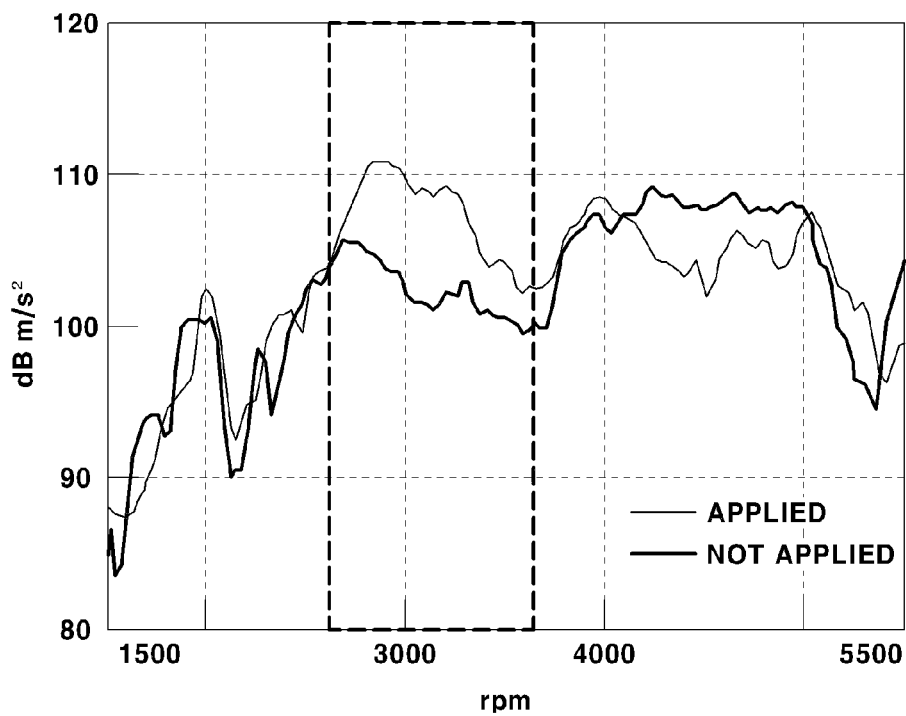
FIG. 8 is a view for comparing results of a vibration analysis of a floor of a vehicle body in a case in which the exemplary damper of the present invention is applied and a case in which the damper in the related art is applied.

FIG. 7 is a view for comparing results of a frequency analysis of the drive shaft in a case in which the damper 10 of the present invention is applied to the drive shaft 1 and a case in which the damper 110 in the related art is applied to the drive shaft 1, and FIG. 8 is a view for comparing results of a vibration analysis of a floor of a vehicle body in a case in which the damper 10 of the present invention is applied and a case in which the damper 110 in the related art is applied.

As illustrated, when comparing a case in which the damper 10 of the present invention to which the rigidity tuning member 50 is applied is used with a case in which the damper 110 in the related art is used, frequency properties of the damper may be changed by using the rigidity tuning member 50 as illustrated in FIG. 7 when the damper 10 of the various embodiments illustrated in FIGS. 4, 5A and 5B is used.

It can be seen that vibration in the vehicle is changed depending on a change in damping frequency, as illustrated in FIG. 8.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable frequency damper for a drive shaft of a vehicle, comprising:
    a mass body made of a metallic material and having mass;
    a damper body configured to be disposed on the drive shaft and to which the mass body is coupled;
    a banding member configured to fix the damper body to the drive shaft; and
    a rigidity tuning member which is disposed on the banding member to press the damper body, and changes rigidity of the damper body depending on a degree to which the damper body is pressed,
    wherein the rigidity tuning member is disposed on the banding member, which is configured to fix an end portion of the damper body to the drive shaft, so as to be movable in an axial direction based on the damper and the drive shaft, so that a degree to which the damper body is pressed is changed depending on a position of the rigidity tuning member in the axial direction.

2. The variable frequency damper of claim 1, wherein the rigidity tuning member presses a bridge portion that is a portion that is connected between a portion of the damper body where the mass body is disposed and the end portion of the damper body which is configured to be fixed to the drive shaft by the banding member.

3. The variable frequency damper of claim 1, wherein the rigidity tuning member is formed in a ring shape and coupled to an outer circumferential surface of the banding member in a threaded connection manner.

4. The variable frequency damper of claim 3, wherein a pressing portion, which has a shape having a decreased inner diameter, is formed at one end of the rigidity tuning member to protrude toward an inside of the ring shape, and the pressing portion presses the damper body.

5. The variable frequency damper of claim 3, further comprising:
    a display device which visually and distinguishably displays a rotation amount of the rigidity tuning member.

6. The variable frequency damper of claim 5, wherein the display device includes:
    gradations which are provided on the rigidity tuning member in a circumferential direction; and
    an indicating portion which is provided on the banding member to indicate one of the gradations.

* * * * *